United States Patent [19]

Umegaki et al.

[11] Patent Number: 5,058,981

[45] Date of Patent: Oct. 22, 1991

[54] LIGHT SOURCE DEVICE

[75] Inventors: Shinsuke Umegaki, Kanagawa; Takafumi Uemiya, Osaka; Naota Uenishi, Osaka; Yo Shimizu, Osaka, all of Japan

[73] Assignee: Sumitomo Electric Industries, Ltd., Osaka, Japan

[21] Appl. No.: 444,934

[22] Filed: Dec. 4, 1989

[30] Foreign Application Priority Data

Dec. 5, 1988 [JP] Japan ............................... 63-307611

[51] Int. Cl.$^5$ .......................... G02B 6/32; G02B 6/34
[52] U.S. Cl. .................................. 359/328; 359/743; 359/565; 359/641; 385/33; 385/37
[58] Field of Search ............ 350/96.18, 96.19, 162.17, 350/162.2, 162.22, 762.16, 452, 96.29; 307/427, 430

[56] References Cited

U.S. PATENT DOCUMENTS

| | | | |
|---|---|---|---|
| 3,809,455 | 5/1974 | Pekau et al. | 350/96.19 |
| 4,050,782 | 9/1977 | Uchida et al. | 350/96.19 |
| 4,077,701 | 3/1978 | Steensma et al. | 350/96.19 |
| 4,178,066 | 12/1979 | Divita | 350/96.19 |
| 4,389,085 | 6/1983 | Mori | 350/96.18 |
| 4,815,807 | 3/1989 | Kaneko et al. | 350/96.18 |
| 4,838,638 | 6/1989 | Kamiyama et al. | 350/96.19 |
| 4,874,221 | 10/1989 | Ohsawa | 307/430 |
| 4,892,375 | 1/1990 | Chikuma et al. | 350/96.18 |
| 4,893,888 | 1/1990 | Okazaki et al. | 350/96.3 |
| 4,900,129 | 2/1990 | Vanderwerf | 350/452 |
| 4,909,587 | 3/1990 | Okamoto et al. | 350/96.19 |
| 4,909,596 | 3/1990 | Okazaki et al. | 307/427 |
| 4,919,511 | 4/1990 | Ohsawa | 350/96.29 |
| 4,923,277 | 5/1990 | Okazaki et al. | 350/96.29 |

FOREIGN PATENT DOCUMENTS

| | | | |
|---|---|---|---|
| 0110851 | 8/1979 | Japan | 350/96.18 |
| 0071918 | 5/1980 | Japan | 350/96.18 |
| 0161841 | 10/1982 | Japan | 350/162.22 |

OTHER PUBLICATIONS

Kawano et al., "Combination Lens Method for Coupling Laser Diode to a Single-Mode Fiber", Applied Optics; vol. 24, No. 7; Apr. 1985, pp. 984-989.

Primary Examiner—Bruce Y. Arnold
Assistant Examiner—R. D. Shafer
Attorney, Agent, or Firm—Cushman, Darby & Cushman

[57] ABSTRACT

A device for generating a second harmonic from a laser source is disclosed. The light from the laser passes through an optical fiber in which the second harmonic is generated. The light exiting from the optical fiber has a conical wave surface which is incident upon a collimating lens. Because the collimating lens has a diffraction lattice formed thereon, it is easy and efficient to collimate the second harmonic. It is also possible to decrease the size of the apparatus due to the use of the diffraction lattice formed on the collimator lens. This enable such a device to be particularly useful with a small sized light source such as a semiconductor laser.

7 Claims, 3 Drawing Sheets

LIGHT SOURCE DEVICE

BACKGROUND OF THE INVENTION

1. Field of the Invention:

The present invention is directed to a light source device capable of creating secondary higher harmonic waves and in turn transforming the waves into parallel beams of light. The secondary higher harmonic waves are generated using laser beams passed through a secondary higher harmonic wave generating element.

2. Description of the Related Art:

In a secondary higher harmonic wave generating element of the photo waveguide path type, however, the secondary higher harmonic waves radiate from the photo waveguide unit having a given width towards the substrate, so that there are no desirable wave surface characteristics are exhibited. Namely, the secondary higher harmonic waves are composed of groups of parallel beams of light showing a surface symmetry, and hence there is such a defect that the beams of light can not be converged at a small spot. As a result, it has been difficult, until now, to apply the secondary higher harmonic waves to writing to an optical storage medium such as a photo disk having minute pits and reading from the optical storage medium.

In contrast, the secondary higher harmonic wave generating element of the optical fiber type exhibits an axial symmetry, and therefore these secondary higher harmonic waves are expanded in a ring-like configuration. It is expected that favorable convergence characteristics are provided.

To be specific, the secondary higher harmonic waves emerging from the secondary higher harmonic wave generating element of the optical fiber type have equi-phase surfaces each assuming a conical shape. FIG. 8 depicts this feature. The secondary higher harmonic waves expand to form a conical beam B via a clad 42 of an optical fiber 4. For the purpose of converting beam B into parallel beams of light, as illustrated in FIG. 9, a conical collimator lens 50 can be employed.

Since the conical collimator lens 50 has a considerable thickness, it is difficult to apply to a small-sized light source device and the handling and adjustment thereof are inconvenient and cumbersome. An additional problem is that the light source device can not satisfactorily be miniaturized.

SUMMARY OF THE INVENTION

A non-linear optical effect may be understood as a phenomenon wherein polarization is proportional to terms having a higher-order than the square of the electric field of the light incident upon a medium. This phenomenon permits generation of the secondary higher harmonic waves by the medium.

An element having such a medium is referred to as a non-linear optical element. Inorganic materials such as $KH_2PO_4$, $LiNbO_3$ and the like are often utilized. Much attention has recently been paid to organic materials represented by 2-methyl-4-nitroaniline (MNA), because these materials have a large non-linear optical constant.

Where the non-linear optical element is used as a secondary higher harmonic wave generating element, the secondary higher harmonic wave generating element for use comes under a photo waveguide type. An arrangement of the photo waveguide type is that an elongated photo waveguide unit through which the light travels while being confined therein is formed on a substrate, and an overlayer is covered thereon. A photo waveguide path is required to have a structure adaptable to a propagation phase velocity of the secondary higher harmonic waves in order to propagate the secondary higher waves generated in the photo waveguide unit or the like. Namely, the photo waveguide path has to match in phase with the secondary higher harmonic waves. A wide variety of methods are available for obtaining this phase conformity. The simplest method of obtaining the phase conformity may involve the use of the Cerenkov radiation system.

The Cerenkov radiation system is arranged in such a way that if the secondary higher harmonic waves, which are, as illustrated in FIG. 7, generated from the light travelling through a photo waveguide unit 11 at a point A, leak into an overlayer 13 as well as into a substrate 12 at an angle $\theta$, the secondary higher harmonic waves radiate in a range defined by the angle $\theta$ when equi-phase surfaces of the secondary higher harmonic waves again leak in a $\theta$-direction at a point B after a unit time has passed coinciding with equi-phase surfaces of the above-mentioned secondary higher harmonic waves. Let $n_s(w)$ be a refraction factor of the substrate 12 or the overlayer 13 to fundamental waves, let $n_G(w)$ be a refraction factor of the waveguide unit 11, and let $n_s(2w)$ be a refraction factor of the substrate 12 or the overlayer 13 to the secondary higher harmonic waves. The phase conformity can automatically be attained and the Cerenkov radiation can also be effected on a condition that the following requirement is satisfied:

$$n_s(2w) > n_G(w) > n_s(w)$$

Hence, the Cerenkov radiation is adopted as a system capable of obtaining the phase conformity in the simplest manner.

It is a primary object of the present invention to provide a light source device capable of creating secondary higher harmonic waves generated from incident laser light on a secondary higher harmonic wave generating element whose output is easy to condense. This facilitates the handling and adjustment of the present invention and allows further miniturization of the configuration.

To accomplish the above-described object, according to one aspect of the invention, there is provided a light source device comprising a laser light source, an optical fiber type secondary higher harmonic wave generating element for generating secondary higher harmonic waves by admitting incident of laser beams emitted from the laser light source, and a collimator lens for converting the secondary higher harmonic waves emerging from the secondary higher harmonic wave generating element into parallel beams of light. The collimator lens has an annular diffraction lattice pattern arranged such that respective oblique surfaces of diffraction lattices are formed in concentric circles at equal spacings, the oblique surfaces partially constituting side surfaces of a plurality of conical bodies concentric with the concentric circles.

According to the light source device based on the above-described construction, the laser beams emitted from the laser source are led to the optical fiber type secondary higher harmonic wave generating element, wherein the secondary higher harmonic waves are generated. The secondary higher harmonic waves are changed into waves exhibiting an axial symmetry and having equi-phase surfaces each assuming a conical shape, thus expanding from an end surface of an optical fiber.

When causing the secondary higher harmonic waves to pass through a plurality of diffraction lattices concentrically disposed at equal spacings, the secondary higher harmonic waves are converted into parallel beams of light of a predetermined degree by diffractive action of the diffraction lattices. In this case, respective oblique surfaces of the diffraction lattices constitute side surfaces of the conical bodies, whereby the parallel beams of light radiate in a well-separated state from beams of light of other degrees.

BRIEF DESCRIPTION OF THE DRAWING

The present invention will now be described with reference to the attached Figures in which.

DETAILED DESCRIPTION OF THE PRESENTLY PREFERRED EXAMPLARY EMBODIMENT

An embodiment of the present invention will be described with reference to the accompanying drawings.

Figure 1:
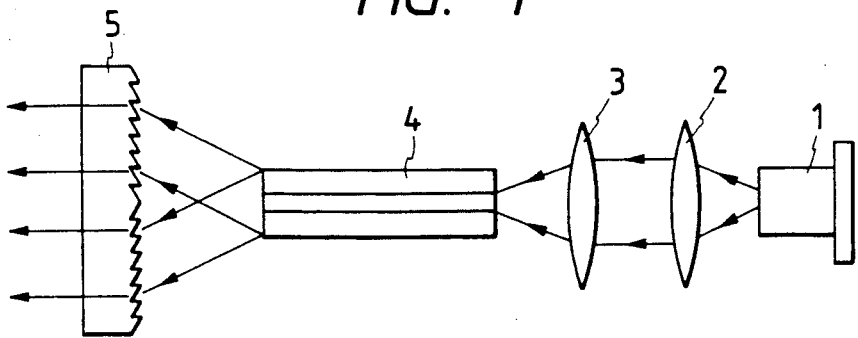
FIG. 1 is a block diagram showing one embodiment of a light source device.
Figure 2A:
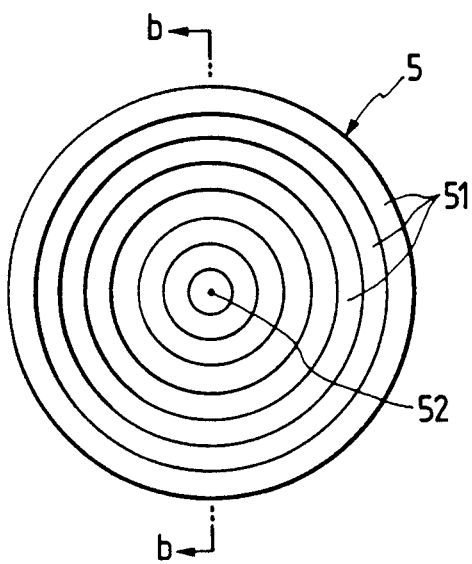
FIG. 2(a) is a front elevational view depicting a configuration of a Fresnel collimator lens.
Figure 2B:
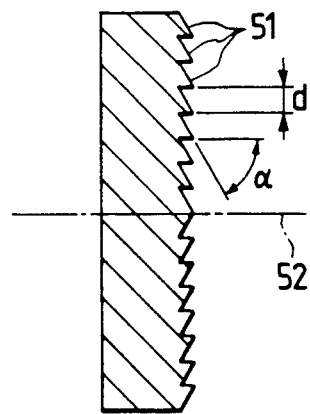
FIG. 2(b) is a sectional view of the lens shown in FIG. 2(a) taken along the line b—b.

Turning first to FIG. 1, there is illustrated a light source device composed of: a laser light source 1 such as a semiconductor laser or the like; a spherical lens 2 for collimating laser beams emitted from the laser light source 1; a condensing spherical lens 3 for condensing the parallel beams of light; an optical fiber type secondary higher harmonic wave generating element 4 including a core 41 formed of a known non-linear optical material such as an MNA and a clad 42 formed of glass; and a Fresnel collimator lens 5 for collimating the secondary higher harmonic waves generated from the optical fiber type secondary higher harmonic wave generating element 4. An optical axis of the Fresnel collimator lens is disposed to coincide with a symmetric axis of the optical fiber type secondary higher harmonic wave generating element 4. An arrangement of the Fresnel collimator lens 5 is that a thin glass substrate is, as illustrated in FIG. 2, concentrically incised with a plurality of annular diffraction lattices having pitch d. Oblique surfaces 51 of the diffraction lattices are rectilinearly shaped to respectively have a given angle as shown in FIG. 2(b) cut along a central axis 52 of the concentric circle. In other words, suppose that a plurality of conical bodies are formed to have the same vertical angle with respect to the central axis 52, the oblique surfaces 51 are arranged to partially constitute side surfaces of these conical bodies, wherein α is the angle made by the oblique surface 51 of the diffraction lattice and by the central axis 52.

Figure 3A:
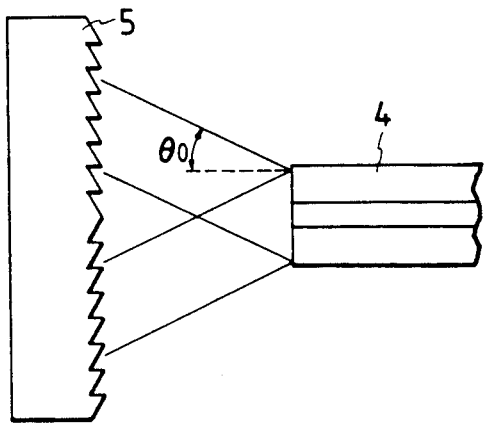
FIGS. 3(a) and 3(b) are side views of the second harmonic beams entering and passing through the Fresnel collimator lens.
Figure 3B:
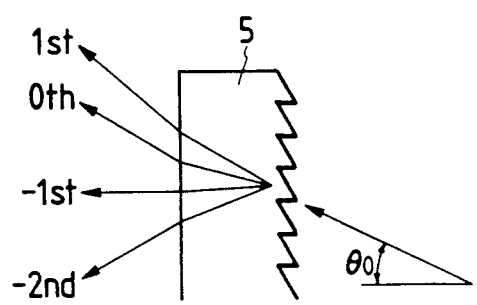

In the thus constructed light source device, the secondary higher harmonic waves emerging from the optical fiber type secondary higher harmonic wave generating element 4 are, as depicted in FIG. 3(a), incident on the Fresnel collimator lens 5 at a given angle $\theta_o$ to a symmetric axis (major axis) of the optical fiber 4, thereby generating, as illustrated in FIG. 3(b), 1st, 0th, −1st and −2nd order diffractive beams of light by means of diffraction.

To convert, e.g., the −1st order light into a parallel beam of light, the pitch d of the diffraction lattice is set to satisfy the following diffraction formula:

$$\sin \theta_o = \lambda/d$$

In order to have the −1st order light at an angle suitable for separating the −1st order light well from beams of light of other degrees, an inclined angle $\alpha_o$ of the diffraction lattice surface may be equalized to or approximate an angle $\alpha_o$ which satisfies the following formula:

$$\tan \alpha_o = (n - \cos\theta_o)/\sin\theta_o$$

where n is the glass refractive factor. It is to be noted that the inclined angles of the respective diffraction lattices do not necessarily strictly coincide with each other. There is no problem if these angles are different from each other on condition that they approximate $\alpha_o$.

Thus, the parallel beams of light can be emitted from the Fresnel collimator lens 5. These beams of light are condensed by a well-known condensing means, thus obtaining a small spot which substantially matches with a light wavelength limit.

Figure 4:
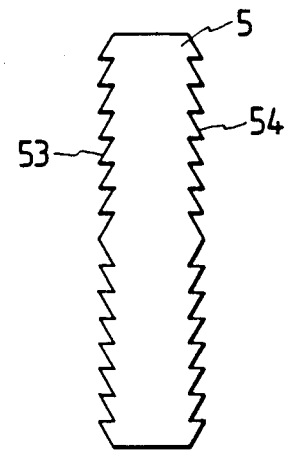
FIGS. 4-6 are views showing possible variations of the Fresnel collimator lenses.

The Fresnel collimator lens 5 is constructed by forming the annular lattices on the glass substrate and can therefore be formed thin without difficulty. In addition to this advantage, the collimator lens 5 enables miniaturization of the light source device as a whole.

note that the Fresnel collimator lens 5 is not limited to the above-described configuration. For instance, the collimator lens may assume such a configuration that diffraction lattice patterns 53 and 54 are, as depicted in FIG. 4, provided on both surfaces of the lens. With this arrangement, the pitch d of the diffraction lattice can be widened. Advantageously, this in turn facilitates processing of the diffraction lattices and is conducive to an improvement of processing accuracy.

Figure 5:
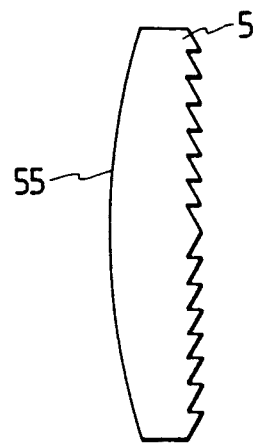

One surface may be formed, as illustrated in FIG. 5, in a spherical shape 55, thereby obtaining an optical element in which the diffraction lattices for collimating the beams of light and a convex lens for condensing the beams of light are combined.

Figure 6:
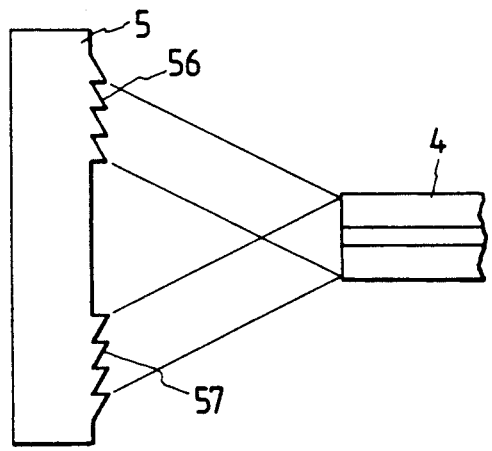
Figure 7:
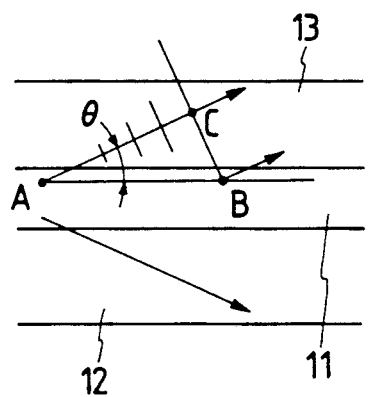
FIG. 7 is a diagram explaining a Cerenkov radiation system.
Figure 8:
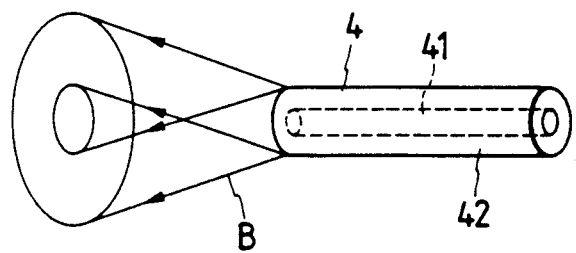
FIG. 8 is a view illustrating beams which radiate from an optical fiber.
Figure 9:
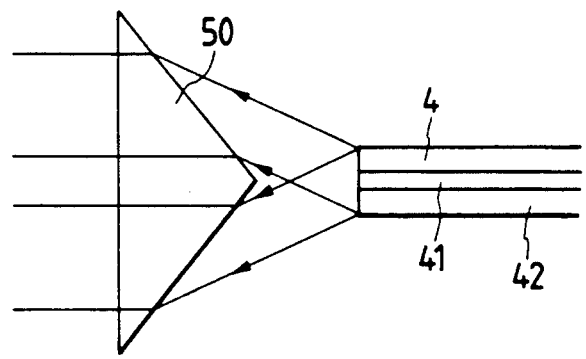
FIG. 9 is a view showing an example of the prior art where beams of light are condensed by a conical lens.

The diffraction lattices are not necessarily provided on the entire surface of the Fresnel collimator lens 5. As shown in FIG. 6, the pattern may be formed only on portions 56 and 57 which admit the secondary higher harmonic waves. A variety of modifications in design can be effected without departing from the essence of the present invention.

In the light source device of the invention, the optical fiber type secondary higher harmonic wave generating element emits the secondary higher harmonic waves that exhibit axial symmetry and have conical equi-phase surfaces. The secondary higher harmonic waves pass through the Fresnel collimator lens having the diffraction lattice pattern in which the diffraction lattices are concentrically formed at equal spacings, and the oblique surfaces thereof constitute the side surfaces of a plurality of conical bodies, the central axis of which is common to that of the concentric circles. Thus, it is possible to acquire the parallel beams of light which are well separated from beams of light of other degrees.

Hence, the beams of light can be converged to a small spot, and the collimator lens can also be formed thin. This is advantageous in that the present invention has an application particularly as a small-sized light source device.

While the invention has been described in connection with what is presently considered to be the most practical and preferred embodiment, it is to be understood that the invention is not to be limited to the disclosed embodiment, but is intended to cover various modifications and equivalent arrangements included within the spirit and scope of the appended claims.

What is claimed is:

1. A light source device comprising:
   a laser light source;
   an optical fiber type secondary higher harmonic wave generating element for generating secondary higher harmonic waves from an admitted incident laser beam emitted from said laser light source; and
   a collimator lens for converting said secondary higher harmonic waves emerging from said secondary higher harmonic wave generating element into parallel beams of light, said collimator lens having an annular diffraction lattice pattern arranged such that respective oblique surfaces of diffraction lattices formed in concentric circles at equal spacings partially constitute side surfaces of a plurality of conical bodies concentric with said concentric circles.

2. The apparatus as claimed in claim 1, wherein said diffraction lattice pattern is formed in a concentric ring about a center axis of the collimator lens.

3. The apparatus as claimed in claim 1, wherein said collimator lens has a spherical output side for focusing the second harmonic beams to a small spot.

4. The apparatus as claimed in claim 1, wherein said collimator lens has a lattice pattern on both an input and an output side for widening a pitch of the diffraction lattice.

5. The apparatus as claimed in claim 1, wherein said collimator lens has a center aligned with the optic axis of the fiber.

6. The apparatus as claimed in claim 1, further comprising:
   a collimating spherical lens for collimating the light emitted from the laser source; and
   a condensing spherical lens for condensing the collimated light onto the optical fiber.

7. The apparatus as claimed in claim 1, wherein said laser source is a semiconductor laser.

* * * * *